Patented Feb. 24, 1942

2,274,624

UNITED STATES PATENT OFFICE 2,274,624

VAPOR PHASE ISOMERIZATION OF HYDROCARBONS

Frank M. McMillan, Berkeley, Calif., assignor to Shell Development Company, San Francisco, Calif., a corporation of Delaware No Drawing. Application April 13, 1940,
Serial No. 329,552

9 Claims. (Cl. 260—676)

The present invention relates to the treatment of saturated hydrocarbons in the vapor phase with the aid of aluminum halide catalysts. A more particular aspect of the invention relates to the vapor phase isomerization of butane with the aid of aluminum chloride.

An object of the invention is to provide a method whereby saturated hydrocarbons may be treated in the vapor phase with aluminum halide catalysts in a more advantageous and economical manner. More particular objects of the invention are to provide a method for the vapor phase isomerization of butane whereby higher average conversions per pass may be maintained and wherein the active life of the catalyst may be considerably lengthened.

The aluminum halides constitute a well-known class of catalytic agents. These catalysts, especially aluminum chloride and aluminum bromide, are capable of catalyzing a large number of reactions and find considerable application in the alkylation of paraffin hydrocarbons with olefin hydrocarbons, the cracking of hydrocarbons, the polymerization of unsaturated hydrocarbons, Friedel-Crafts reactions and the like. It has further been more or less recently found that these catalysts, when used under certain conditions, are capable of catalyzing the isomerization of saturated hydrocarbons. This latter reaction is most desirable and valuable since it provides a means for producing valuable branched-chain hydrocarbons such as isobutane, isopentane, isohexane, etc., from the abundant supplies of their less valuable normal isomers, the conversion of methyl and dimethyl cyclopentane to cyclohexane and methyl cyclohexane, improvement in anti-knock characteristics of many pro-knocking gasoline distillates, and many other desirable transformations. In the practical execution of these valuable reactions considerable difficulty is encountered due to the very great tendency of these catalysts to promote cracking, polymerization and other undesirable side reactions. These side reactions not only decrease the yields and produce an impure inferior product, but they also cause the catalyst to sludge and materially decrease its active life.

The catalytic activity of aluminum halide catalysts, particularly toward cracking, depends upon the presence of a trace of hydrogen halide and appears to be more or less proportional to the concentration of hydrogen halide present. When the reaction is executed in the liquid phase the effective concentration of hydrogen halide is limited by the partial pressure and solubility in the reaction mixture. Since the solubilities of the hydrogen halides in liquid saturated hydrocarbons are relatively small, considerable quantities and pressures of hydrogen halide may be used when executing the reaction in the liquid phase without unduly promoting the cracking tendency of the catalyst and thereby the undesirable side reactions. When the process is executed in the vapor phase, however, it has hitherto been shown by numerous experiments that the concentration of hydrogen halide in the reaction mixture must be quite low in order to avoid excessive degradation. Thus, in the vapor phase isomerization of saturated hydrocarbons concentrations of hydrogen halide not greater than 5%, and preferably ranging between about 0.5% and 3%, are recommended, and it is considered as an accepted fact that larger concentrations cause excessive degradation reactions and render the process commercially impractical.

I have investigated the vapor phase treatment of various individual saturated hydrocarbons and hydrocarbon fractions with aluminum halide catalyst, particularly with regard to the effect of the hydrogen halide upon the amount of side reactions and practical catalyst life. In concurrence with the results of other investigators in this field, I too have been able to conclusively demonstrate that when saturated hydrocarbon vapors and a hydrogen halide are passed over active aluminum halide catalysts under commercially practical reaction conditions, excessive degradation takes place unless the concentration of hydrogen halide is quite low, i. e., below about 10%, and in the great majority of cases below about 5% by volume. I found, however, that these low limits of applicable concentrations of hydrogen halide apply only to fresh and relatively active catalysts, and that as the reaction progresses greater and greater concentrations of hydrogen halide may be employed without causing any noticeable increase in the undesirable side reactions. I also found that by continuously or intermittently increasing the concentration of hydrogen halide as the reaction progresses while maintaining the concentration of hydrogen halide always below that causing excessive degradation, a much superior and more economical process may be realized. By executing the process in this manner much higher over-all conversions may be maintained, and the life of the catalyst may be greatly increased.

According to the process of my invention, the treatment of a saturated hydrocarbon or hydrocarbon fraction in the vapor phase with an aluminum halide catalyst is initially executed with the fresh catalyst in the conventional manner in the presence of a small concentration of hydrogen halide. The maximum concentration of hydrogen halide applicable at the start of the process depends upon the material treated, the catalyst, and the reaction conditions (i. e. temperature, pressure and space velocity), and may vary considerably. For conditions such as can be suitably employed in commercial operation, the initial concentration of hydrogen halide is quite low and usually less than 5% by volume. As the reaction progresses the concentration of hydrogen halide is gradually increased either continuously or intermittently, care being taken, however, that the concentration of hydrogen halide is at all times below that causing excessive decomposition. If the concentration of the hydrogen halide is increased intermittently, this may be done by a few relatively large increases, for instance by 1 or 2% increases, or by a larger number of small increases. In this way the concentration may be gradually increased until a point is reached where the lowered concentration of feed and the cost of recovering the product make a further increase in the hydrogen halide concentration uneconomical. Thus, the maximum concentration of hydrogen halide employed in the process may eventually be 30–50% by volume, or even higher.

The employment of these large concentrations of hydrogen halide, according to the process of the present invention, does not incur operating difficulties or practical disadvantages. A most convenient and advantageous method of executing such reactions according to the present method is to recover the hydrogen halide from the reaction product, for instance by fractional distillation, and recycle it through the reaction zone along with the fresh incoming hydrocarbon feed. When operating in this manner, the actual quantities of hydrogen halide employed are quite small and the benefits of the process of my invention may be realized with practically no increased cost. Furthermore, a gradual and uniform increase in the hydrogen halide concentration may be conveniently effected by continuously feeding a small appropriate quantity of hydrogen halide into the recovered and recycled hydrogen halide.

The present method of executing reactions with the aid of aluminum halide catalysts is suitable for and may be employed in any process wherein it is desired to treat a saturated hydrocarbon or mixture of saturated hydrocarbons in the vapor phase with an aluminum halide catalyst while avoiding degradation and sludging of the catalyst. Very suitable applications of the invention are in the isomerization of normal paraffin hydrocarbons to their branched-chain isomers, the isomerization of methylated cyclopentanes to corresponding cyclohexane isomers, and the treatment of saturated paraffinic hydrocarbon fractions boiling in the gasoline range to increase their anti-knock characteristics. A particular process for which the present method is exceptionally advantageous is in the isomerization of normal butane to isobutane. These treatments, when executed according to the process of the invention, differ materially from the practice hitherto in that the concentration of hydrogen halide is gradually increased, and during the greater part of the process is considerably greater than those hitherto believed to be applicable. Thus, during the greater part of the process, the concentration of hydrogen halide is usually greater than 10%. The employment of such concentrations of hydrogen halide in the vapor phase isomerization process is a complete departure from the usual practice.

In the commercial application of the invention, the hydrogen halide employed will usually be anhydrous hydrogen chloride. Hydrogen bromide, hydrogen iodide and hydrogen fluoride will find less extensive use than hydrogen chloride since they are considerably more costly.

Of the various aluminum halides, anhydrous aluminum chloride is generally the most practical and is preferred. It is preferably employed in conjunction with an aluminous or siliceous carrier material containing a small amount of firmly-bound water, but may be employed as solid fused pieces or pressed pills, or may be simply supported upon an inert carrier material such as active carbon, pumice, chamotte or the like. The most suitable carrier materials are activated, i. e., possess appreciable adsorptive properties. Especially suitable catalysts are described in copending applications, Serial No. 290,256 filed Aug. 15, 1939, Serial No. 296,898 filed Sept. 28, 1939, Serial No. 292,295 filed Aug. 28, 1939, Serial No. 254,885 filed Feb. 6, 1939.

After the concentration of hydrogen halide has been increased during processing up to the maximum economical concentration, for instance 50–60% by volume, the reaction is preferably continued at this concentration of hydrogen halide, and if desired at increased temperatures and/or decreased space velocity until such time as the activity of the catalyst has declined to an uneconomical level. At this point, the catalyst is either removed and discarded or regenerated. The process is then repeated, starting with a fresh or regenerated catalyst and a low-concentration of hydrogen halide, for instance 3% by volume. Suitable methods for regenerating the spent catalyst are described in copending application, Serial No. 322,208 filed March 4, 1940.

The following examples relating to the isomerization of butane under comparable conditions are purposely chosen to illustrate the various aspects of the invention, and are not to be construed as limiting the invention in any manner. My invention is not restricted to this particular reaction, nor to these particular reaction conditions.

*Example I*

A series of experimental runs employing varying concentrations of hydrogen chloride in the vapor phase isomerization of n-butane with fresh aluminum chloride-adsorptive alumina catalyst at 100° C., 11 atmospheres pressure and a space velocity of 6 mols butane/liter catalyst/hour showed that the optimum initial concentration of hydrogen chloride is about 2–3% by volume. With this optimum concentration of hydrogen chloride, the initial conversion gives 64% isobutane and undesirable degradation reactions are negligible. Continuing the treatment with 2–3% hydrogen chloride, the conversion gradually falls off, the isobutane content of the product being about 53% at the end of 100 hours of operation, and about 48% at the end of 160 hours of operation. If the initial concentration of hydrogen chloride is increased to 7%, the activity of the catalyst declines much more rapidly, the isobutane content of the product dropping to about 37% in only 100 hours of operation. If the initial concentration of hydrogen chloride is made still greater, the amount of degradation reactions is greatly increased, and the rate of decline of the catalyst activity is still more marked. These experiments clearly illustrate the detrimental effect of excessive initial concentrations of hydrogen halide.

*Example II*

Normal butane was isomerized under the conditions mentioned in Example I, starting with fresh aluminum chloride—adsorptive alumina catalyst and the optimum 3% of hydrogen chloride in the feed. During a little over two weeks of continuous operation the isobutane content of the product gradually fell from an initial value of 61% to 36%. In the practice hitherto, the process would be stopped at this point and the spent catalyst would be replaced by fresh catalyst. Instead, however, the hydrogen chloride content of the feed was increased to 10% and the process continued. Contrary to expectation, only a very slight increase in the degradation reactions was observed, and the isobutane content of the product increased to over 50%. The run was continued under these new conditions for an additional 120 hours, at the end of which time the isobutane content of the product was still 54% and the catalyst showed no indication of exhaustion. Thus, by increasing the concentration of the hydrogen chloride, the average conversion was increased considerably, and the practical life of the catalyst was greatly lengthened.

*Example III*

Normal butane was isomerized under the reaction conditions mentioned in Example I. The catalyst was composed of "Porocel" (a treated bauxite) impregnated with anhydrous aluminum chloride. The initial concentration of hydrogen chloride was the optimum 3%. At the end of 325 hours of continuous operation, the concentration of hydrogen chloride was increased to 10%, and at the end of 670 hours it was further increased to 15%. The isobutane content of the product when employing 15% hydrogen chloride was still 45%. Without the increase in the concentration of hydrogen chloride, the isobutane content of the product declined to 31% in 325 hours.

*Example IV*

Normal butane was isomerized under the reaction conditions mentioned in Example I with an initial concentration of hydrogen chloride of about 3%. After about 500 hours of operation, the reaction temperature was increased to 110° C. The concentration of hydrogen chloride recycled with the feed was gradually increased to 10% at the end of 760 hours of operation, and further to 15% at the end of 1760 hours of operation, and further to 20% at the end of about 1925 hours of operation. After increasing the concentration of hydrogen chloride to 20%, the product contained over 50% isobutane. The beneficial effect of increasing the concentration of hydrogen chloride is clearly evident. Before the increase in hydrogen chloride concentration was commenced, the isobutane content of the product had already dropped to 37% in about 600 hours.

While I have in the foregoing described my invention in a detailed and comprehensive manner, and provided specific examples illustrating the same, it is to be understood that modifications and variations will be readily apparent to those skilled in the art, and that no limitations other than those imposed by the scope of the appended claims are intended.

I claim as my invention:

1. In a process for isomerizing butane in the vapor phase with an aluminum halide catalyst and a hydrogen halide, the steps comprising passing vapors of butane together with less than 10 percent by volume of a hydrogen halide under isomerizing conditions through a reaction zone containing a supported aluminum halide catalyst, recovering hydrogen halide from the reaction mixture, recycling said recovered hydrogen halide through the reaction zone, and gradually increasing the concentration of hydrogen halide in said reaction zone to a concentration greater than 10% by volume as the catalyst declines in activity.

2. In a process for isomerizing saturated hydrocarbons in the vapor phase with an aluminum chloride catalyst and hydrogen chloride, the steps comprising passing vapors of the hydrocarbon to be treated together with less than 10% by volume of hydrogen chloride under isomerizing conditions through a reaction zone containing a supported aluminum chloride catalyst, recovering hydrogen chloride from the reaction mixture, recycling said recovered hydrogen chloride through the reaction zone, and gradually increasing the concentration of hydrogen chloride in said reaction zone to a concentration greater than 10% by volume as the catalyst declines in activity.

3. In a process for isomerizing butane in the vapor phase with an aluminum halide catalyst and a hydrogen halide, the steps comprising passing vapors of butane together with a hydrogen halide under isomerizing conditions through a reaction zone containing an aluminum halide catalyst, recovering the hydrogen halide from the reaction mixture, recycling said recovered hydrogen halide through the reaction zone, maintaining the concentration of hydrogen halide in said reaction zone below that causing excessive degradation reactions, and increasing the concentration of hydrogen halide in said reaction zone as the catalyst declines in activity.

4. In a process for isomerizing saturated hydrocarbons in the vapor phase with an aluminum chloride catalyst and hydrogen chloride, the steps comprising passing vapors of the hydrocarbon to be treated together with hydrogen chloride under isomerizing conditions through a reaction zone containing an aluminum chloride catalyst, recovering hydrogen chloride from the reaction mixture, recycling said recovered hydrogen chloride through the reaction zone, maintaining the concentration of hydrogen chloride in said reaction zone below that causing excessive degradation reactions, and increasing the concentration of hydrogen chloride in said reaction zone as the catalyst declines in activity.

5. In a process for treating saturated hydrocarbons in the vapor phase with an aluminum halide catalyst and a hydrogen halide, the steps comprising passing vapors of the hydrocarbon to be treated together with hydrogen halide vapors under isomerizing conditions through a reaction zone containing an aluminum halide catalyst, recovering hydrogen halide from the reaction mixture, recycling said recovered hydrogen halide through the reaction zone, maintaining the concentration of hydrogen halide in said reaction zone below that causing excessive degradation reactions, and increasing the concentration of hydrogen halide in said reaction zone as the catalyst declines in activity.

6. In a process for isomerizing butane in the vapor phase with a supported aluminum chloride catalyst, and hydrogen chloride, the steps comprising maintaining the concentration of hydrogen chloride in the reaction zone below that causing excessive degradation reactions, and increasing the concentration of said hydrogen chloride in the reaction zone as the catalyst declines in activity.

7. In a process for treating saturated hydrocarbons in the vapor phase with a supported aluminum chloride catalyst and hydrogen chloride, the steps comprising maintaining the concentration of hydrogen chloride in the reaction zone below that causing excessive degradation reactions, and increasing the concentration of said hydrogen chloride in the reaction zone as the catalyst declines in activity.

8. In a process for isomerizing butane in the vapor phase with an aluminum halide catalyst and a hydrogen halide, the steps comprising maintaining the concentration of hydrogen halide in the reaction zone below that causing excessive degradation reactions, and increasing the concentration of said hydrogen halide in the reaction zone as the catalyst declines in activity.

9. In a process for treating saturated hydrocarbons in the vapor phase with an aluminum halide catalyst and a hydrogen halide, the steps comprising maintaining the concentration of hydrogen halide in the reaction zone below that causing excessive degradation reactions, and increasing the concentration of said hydrogen halide in the reaction zone as the catalyst declines in activity.

FRANK M. McMILLAN.